United States Patent
Liu et al.

(10) Patent No.: US 12,272,810 B2
(45) Date of Patent: Apr. 8, 2025

(54) LOAD DISTRIBUTING THERMAL RUNAWAY BARRIER FOR A BATTERY CELL

(71) Applicant: GM GLOBAL TECHNOLOGY OPERATIONS LLC, Detroit, MI (US)

(72) Inventors: Yunshan Liu, Rochester Hills, MI (US); Thomas J. Wang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 494 days.

(21) Appl. No.: 17/832,773

(22) Filed: Jun. 6, 2022

(65) Prior Publication Data

US 2023/0395900 A1     Dec. 7, 2023

(51) Int. Cl.
*H01M 10/658* (2014.01)
*H01M 10/613* (2014.01)
*H01M 10/625* (2014.01)
*H01M 10/651* (2014.01)

(52) U.S. Cl.
CPC ....... *H01M 10/658* (2015.04); *H01M 10/613* (2015.04); *H01M 10/625* (2015.04); *H01M 10/651* (2015.04)

(58) Field of Classification Search
CPC ............. H01M 10/658; H01M 10/613; H01M 10/625; H01M 10/651
See application file for complete search history.

(56) References Cited

U.S. PATENT DOCUMENTS

| 6,087,036 A * | 7/2000 | Rouillard | H01M 10/6555 429/66 |
| 2021/0288362 A1 * | 9/2021 | Churchill | H01M 10/0525 |

FOREIGN PATENT DOCUMENTS

CN     113540632 A  *  10/2021

OTHER PUBLICATIONS

Machine translation of CN113540632A (Year: 2024).*

* cited by examiner

*Primary Examiner* — Brian R Ohara
*Assistant Examiner* — M. T. Leonard
(74) *Attorney, Agent, or Firm* — Quinn IP Law

(57) ABSTRACT

A load distributing thermal runaway barrier for an energy storage battery cell pack includes a first separator plate, a second separator plate, and at least one first elastic member arranged between the first and second separator plates. Each first elastic member is configured to maintain a first load in response to a pressure applied to at least one of the first and second separator plates. The load distributing thermal runaway barrier also includes a third separator plate, a fourth separator plate, and at least one second elastic member arranged between the third and fourth separator plates. Each first elastic member is configured to maintain a second load in response to a pressure applied to at least one of the third and fourth separator plates. The load distributing thermal runaway barrier additionally includes a thermally insulating pad arranged between the second and third separator plates.

18 Claims, 5 Drawing Sheets

LOAD DISTRIBUTING THERMAL RUNAWAY BARRIER FOR A BATTERY CELL

INTRODUCTION

The present disclosure relates to a load distributing thermal runaway barrier for a battery cell.

Various electric and electronic devices, such as energy storage cells, control modules, electric motors, computers, etc., release waste heat as a byproduct of their primary operation.

Energy storage cells, e.g., batteries, may be broadly classified into primary and secondary energy storage units. Primary energy storage cells, for example, disposable batteries, are intended to be used until depleted, after which they are simply replaced with one or more new energy storage cells. Secondary energy storage cells, for example, rechargeable batteries, are capable of being repeatedly recharged and reused, therefore offering economic, environmental and ease-of-use benefits compared to disposable energy storage units. Both primary and secondary energy storage cells may be interconnected and organized into energy storage cell packs to deliver desired voltage, capacity, or power density.

Secondary cells, such as lithium-ion batteries, tend to be more prone to thermal runaway, or uncontrolled rise in internal temperature, than primary cells. Specifically, thermal runaway occurs when the internal reaction rate increases until more heat is being generated than may be withdrawn, leading to a further increase in both reaction rate and heat generation. Eventually, the amount of generated heat may be great enough to lead to loss of the cell's utility as well as damage to materials in proximity to the cell. Thermal runaway in a secondary energy storage cell may be initiated by a short circuit within the cell, improper cell use, physical abuse, manufacturing defects, or exposure of the cell to extreme external temperatures.

During a thermal runaway, a large amount of thermal energy is rapidly released, heating the entire cell up to a temperature of 900° C., or greater. Internal pressure of the affected cell will also increase due to the thermal runaway. As a result of the increased temperature and pressure inside the cell undergoing thermal runaway, the temperature of adjacent cells within the cell pack and pressures between individual cells will typically also increase. If the temperature and pressure of adjacent cells is permitted to increase unimpeded, such cells may also enter into a state of thermal runaway—leading to a cascading effect, where the initiation of thermal runaway within a single cell propagates throughout the entire storage cell pack. As a result, power from the cell pack may be interrupted, while a system employing the cell pack may incur collateral damage due to the scale of thermal runaway and the associated release of thermal energy.

SUMMARY

A load distributing thermal runaway barrier for an energy storage battery cell pack includes a first separator plate, a second separator plate, and at least one first elastic member arranged between the first and second separator plates. Each first elastic member is configured to maintain a first load in response to a pressure applied to at least one of the first and second separator plates. The load distributing thermal runaway barrier also includes a third separator plate, a fourth separator plate, and at least one second elastic member arranged between the third and fourth separator plates. Each first elastic member is configured to maintain a second load in response to a pressure applied to at least one of the third and fourth separator plates. The load distributing thermal runaway barrier additionally includes a thermally insulating pad arranged between the second and third separator plates.

The thermally insulating pad may be constructed from an aerogel material.

The thermally insulating pad may have a thickness in a range of 3.6-4.4 mm.

Each first elastic member and second elastic member may be configured as a Belleville spring or cone disc.

Each Belleville spring may have a material thickness in a range of 0.8-1.0 mm.

Each Belleville spring may have a free height in a range of 4.4-5.6 mm.

The load distributing thermal runaway barrier may include a plurality of first Belleville springs and a plurality of second Belleville springs. The plurality of first Belleville springs may be evenly spaced along the first and second separator plates and the plurality of second Belleville springs may be evenly spaced along the third and fourth separator plates. The plurality of first and second Belleville springs may thereby be configured to spread the respective first and second loads across the corresponding first and second separator plates and third and fourth separator plates.

Each first elastic member and second elastic member may be configured a plurality of Belleville first springs arranged in series.

The first elastic member and the second elastic member may be configured to withstand or absorb internal energy storage battery pack operating pressure in a range of 200-600 kPa. The first and second elastic members may be additionally configured to maintain the respective first and second loads over the internal battery pack operating pressure range.

Each of the first, second, third, and fourth separator plates may have a thickness in a range of 0.20-0.30 mm.

Each of the first, second, third, and fourth separator plates may be constructed either from stainless or high-strength steel.

Another embodiment of the present disclosure is directed to a motor vehicle employing a powerplant which uses electrical energy produced by an energy storage system having a battery cell pack to generate torque, with the battery cell pack including the load distributing thermal runaway barrier.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
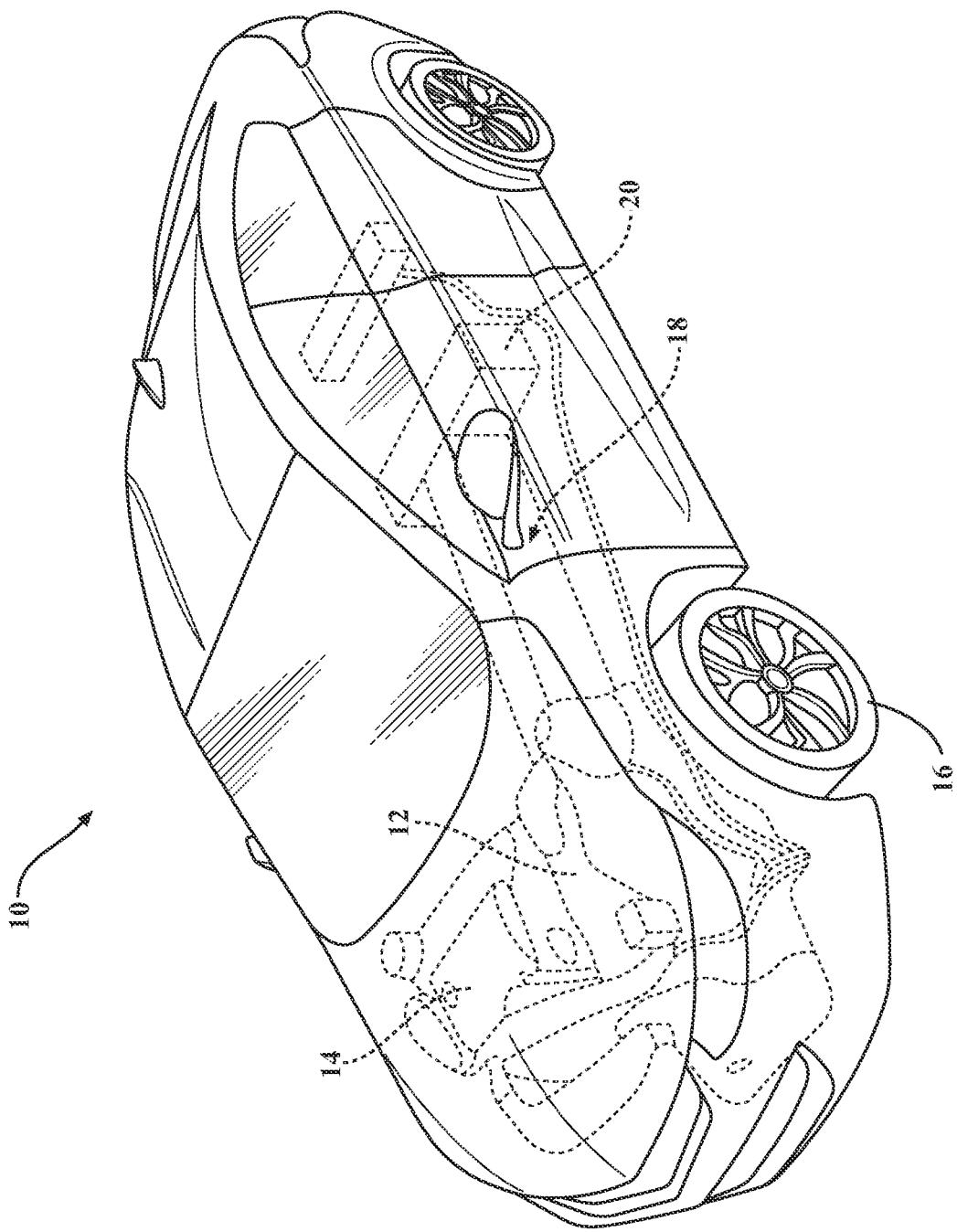
FIG. 1 is a schematic illustration of a vehicle employing a hybrid powertrain and an energy storage system configured to provide electrical energy thereto, according to the disclosure.

Referring to the drawings, FIG. 1 illustrates a vehicle 10. It should be understood that identical element symbols used on multiple figures refer to the same component, or components of equal functionality. Additionally, the accompanying figures are intended to illustrate, not limit, the scope of the disclosure, and should not be considered as depicting components to scale. The vehicle 10 may be, but is not limited to, a commercial vehicle, industrial vehicle, passenger vehicle, train or the like. As shown, the vehicle 10 may be an electric or a hybrid-electric vehicle having one or more power-sources or powerplants to provide vehicle propulsion. Specifically, the vehicle 10 may have a first powerplant 12, such as an electric motor, and a second powerplant 14, such as an internal combustion engine, configured to generate respective drive torques to drive the vehicle via wheels 16.

The vehicle 10 additionally includes an energy storage system 18 configured to provide electrical energy to each of the first powerplant 12 and the second powerplant 14 to facilitate generation of the respective drive torques. As shown in FIG. 1, the energy storage system 18 includes an energy storage battery cell pack 20. The energy storage battery cell pack 20 includes a first battery cell 20-1 and a second battery cell 20-2 (shown in FIG. 2). Each of the first and second battery cells 20-1, 20-2 is configured to generate and store electrical energy through thermal energy generating or releasing electro-chemical reactions. Although the energy storage battery cell pack 20 is specifically shown as having first and second battery cells 20-1, 20-2, the energy storage battery cell pack 20 may include various multiples of energy storage cells arranged either adjacent to each other or generally spaced apart.

In the following description, the terms "energy storage cell", "battery", "cell", and "battery cell" may be used interchangeably and may refer to a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack", as used herein, refers to multiple individual batteries contained within a single piece or multi-piece housing, the individual batteries electrically interconnected to achieve the desired voltage and capacity for a particular application. Additionally, the storage battery cell pack 20 is represented schematically, and, therefore, not all battery elements and/or battery pack elements are shown in the illustrations.

The energy storage system 18 is configured to maintain consistent dissipation of thermal energy emitted or released by the first cell 20-1 and the second cell 20-2 during generally typical charging and discharging of the cells. The energy storage system 18 is also intended to facilitate effective dissipation of thermal energy under less typical, e.g., abusive, operating conditions, and limit the possibility of a thermal runaway in the energy storage cell pack 20. The energy storage system 18 is specifically configured to accomplish the above task via one or more load distributing thermal runaway barriers 22 disposed between individual cells, e.g., 20-1, 20-2, and relative to adjacent structures, to be discussed in detail below. The energy storage system 18 may also include a cooling plate (not shown) using a circulating liquid coolant to aid in managing thermal energy in the battery pack 20.

A variety of different abusive operating/charging conditions and/or manufacturing defects may cause a battery, such as those in battery pack 20, to enter into thermal runaway, where the amount of internally generated heat is greater than that which may be effectively withdrawn. As a result, a large amount of thermal energy is rapidly released, heating the entire cell up to a temperature of 900° C. or greater, and causing the formation of localized hot spots where the temperature may exceed 1500° C. Once a cell, for example the cell 20-1, begins to undergo thermal runaway, the thermal energy generated during this event may heat the adjacent cells, such as the cell 20-2, to above their critical temperature, causing them to enter into thermal runaway. These adjacent cells, in turn, may heat additional cells to a sufficient temperature to cause them to enter into thermal runaway. Thus, the occurrence of a single cell undergoing thermal runaway may initiate a cascading reaction that may spread throughout the entire energy storage cell pack 20.

Although the specification concentrates on the energy storage system 18, other systems that are capable of rapidly releasing significant amounts of thermal energy are also considered to be within the scope of the present disclosure. Such systems may, for example, include consumer electronics, such as telephones and personal computers, as well as other systems that include heat-releasing devices and which may use heat sinks for managing such release of thermal energy. Accordingly, while the following description focuses on applications of the structures described below to the energy storage system 18, applications to such other systems using heat-releasing devices are also envisioned.

Figure 2:
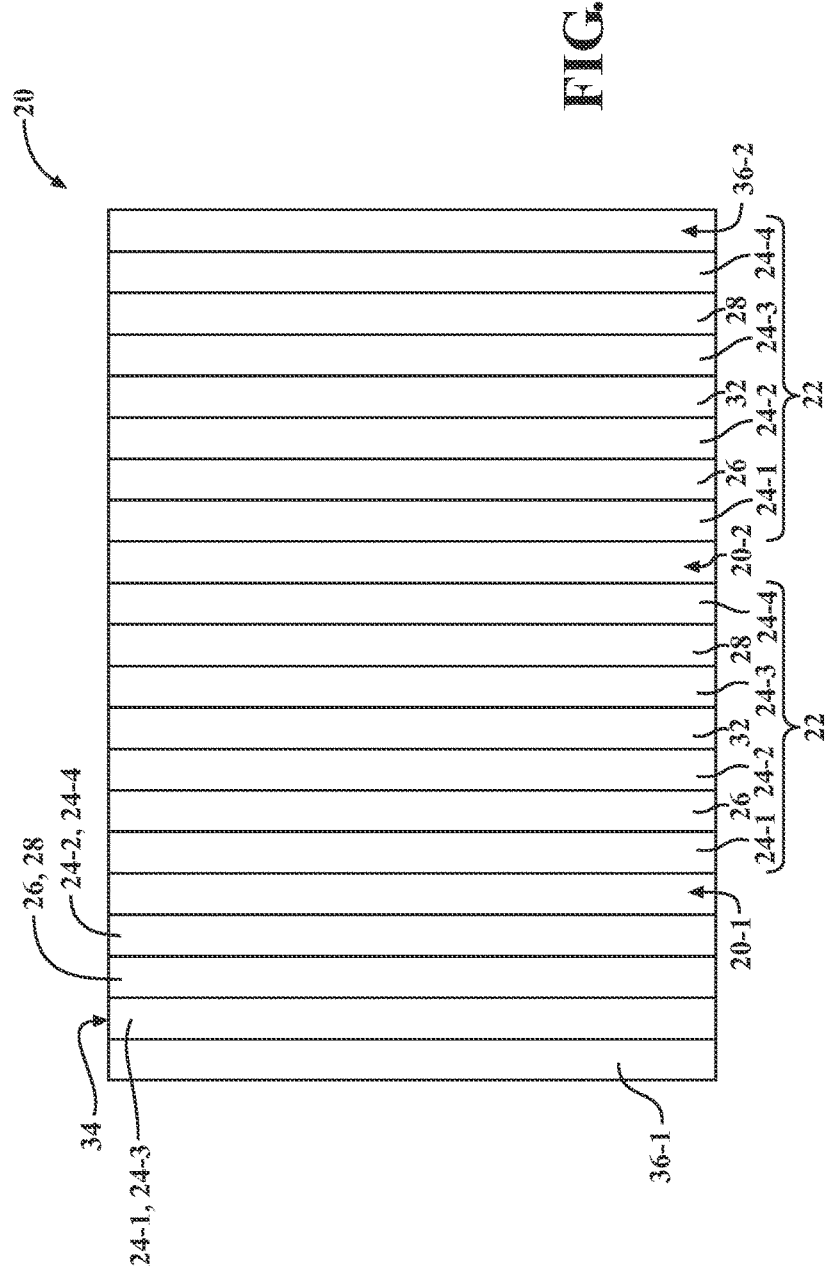
FIG. 2 is a schematic close-up cross-sectional plan view of one embodiment of the energy storage system shown in FIG. 1, wherein the energy storage system includes an energy storage cell pack with individual battery cells positioned between load distributing thermal runaway barriers having elastic members arranged between individual separator plates, according to the disclosure.
Figure 3:
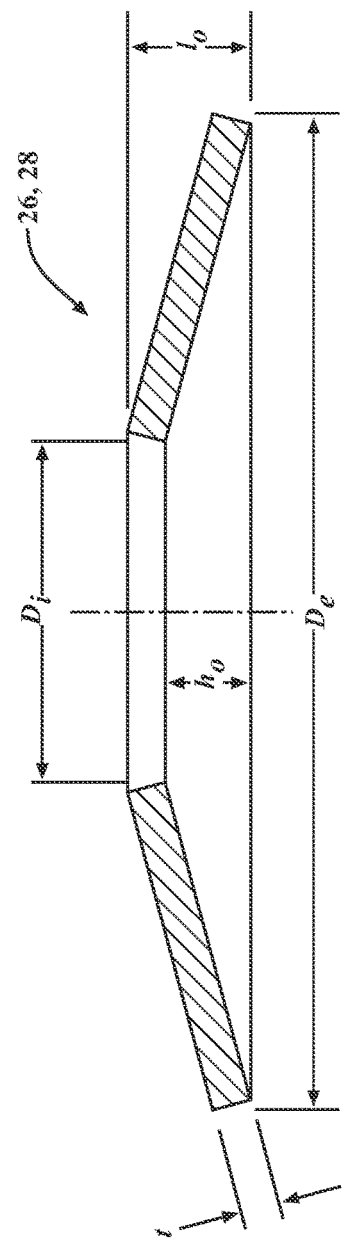
FIG. 3 is a schematic close-up cross-sectional detail view of a Belleville spring elastic member in a free state.

With continued reference to FIG. 2, the energy storage system 18 includes the aforementioned load distributing thermal runaway barrier (or simply "thermal runaway barrier") 22 configured to dissipate the thermal energy produced by the first and second cells 20-1, 20-2. In general, the thermal runaway barrier 22 is arranged between the first cell 20-1 and the second cell 20-2, i.e., contacting proximal sides of the neighboring first and second battery cells. The thermal runaway barrier 22 includes a first separator plate 24-1, a second separator plate 24-2, and one or more first elastic members 26 arranged between the first and second separator plates. The first elastic member(s) 26 are configured to maintain a substantially uniform or consistent first load $F_1$ (shown in FIGS. 4 and 5) in response to a pressure applied to first and/or second separator plates 24-1, 24-2. Each of the first elastic members 26 may be configured as one or more cone discs, i.e., Belleville springs, such as shown in FIG. 3. The subject pressure may be applied to the first and/or second separator plates 24-1, 24-2 during charge/discharge cycling during the operating life of the energy storage cell pack 20.

The load distributing thermal runaway barrier 22 additionally includes a third separator plate 24-3, a fourth separator plate 24-4, and one or more second elastic members 28 arranged between the third and fourth separator plates. The second elastic member(s) 28 are configured to maintain a substantially uniform or consistent second load $F_2$ in response to a pressure applied to third and/or fourth separator plates 24-3, 24-4. Analogous to the first elastic members 26, each of the second elastic members 28 may be configured as one or more Belleville springs (shown in FIG. 3). Accordingly, the first elastic member(s) 26 and the second elastic member(s) 28 apply and distribute their respective first and second loads $F_1$, $F_2$ (shown in FIGS. 4 and 5) in the thermal runaway barrier 22 uniformly or evenly via the respective first, second, third, and fourth separator plates 24-1, 24-2, 24-3, 24-4. Each of the first, second, third, and fourth separator plates 24-1, 24-2, 24-3, 24-4 may be constructed from stainless or high-strength steel. Furthermore, each of the first, second, third, and fourth separator plates 24-1, 24-2, 24-3, 24-4 may have a thickness in a range of 0.20-0.30 mm.

It is intended that each of the first and second elastic members 26, 28 may absorb and withstand internal operating pressure of the battery cell pack 20, i.e., of either the first or second cells 20-1, 20-2, in a range of 200-600 kPa, which may develop as a result of up to 12% battery cell expansion during battery cell cycling over the battery's life. The first and second elastic members 26, 28 may be additionally configured to maintain the respective first and second loads $F_1$, $F_2$ over the internal battery cell pack operating pressure range. More specifically, the first and second elastic members 26, 28 uniformly distribute internal operating pressure in the battery cell pack 20 substantially across the faces of the first and second battery cells 20-1, 20-2, as well as across thermally insulating pad surfaces (described in detail below) in contact with the respective first, second, third, and fourth separator plates 24-1, 24-2, 24-3, 24-4.

Figure 4:
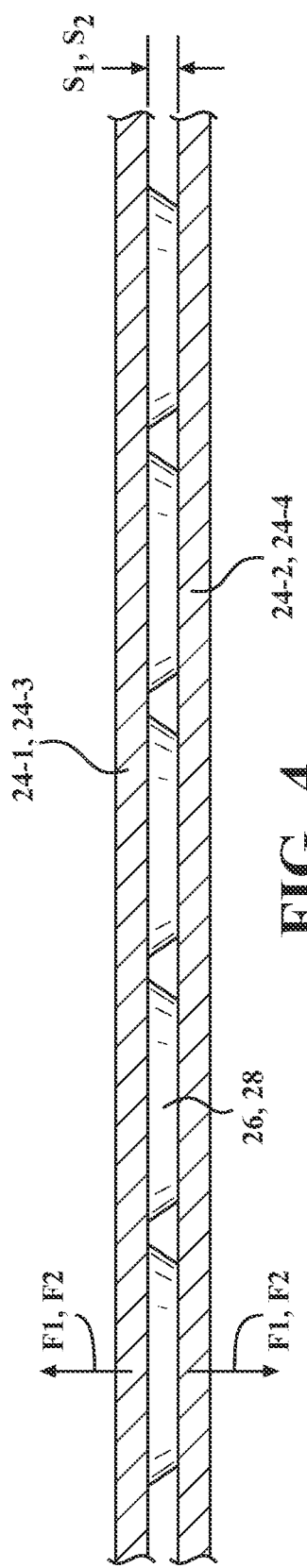
FIG. 4 is a schematic close-up cross-sectional detail view of one embodiment of the load distributing thermal runaway barrier shown in FIG. 2, specifically depicting Belleville spring elastic members evenly spaced between individual separator plates, according to the disclosure.

For example, as shown in FIG. 4, the load distributing thermal runaway barrier 22 may have a plurality of first elastic members 26 arranged in a single layer (effectively in parallel) and interspaced evenly between the first and second separator plates 24-1, 24-2 to generate the requisite uniform first load $F_1$ and spread the subject load evenly across the corresponding first and second separator plates. Similarly, the thermal runaway barrier 22 may have multiple second elastic members 28 arranged in a single layer and interspaced evenly between the third and fourth separator plates 24-3, 24-4 to generate the requisite uniform second load $F_2$ and spread the subject load evenly across the corresponding third and fourth separator plates.

Figure 5:
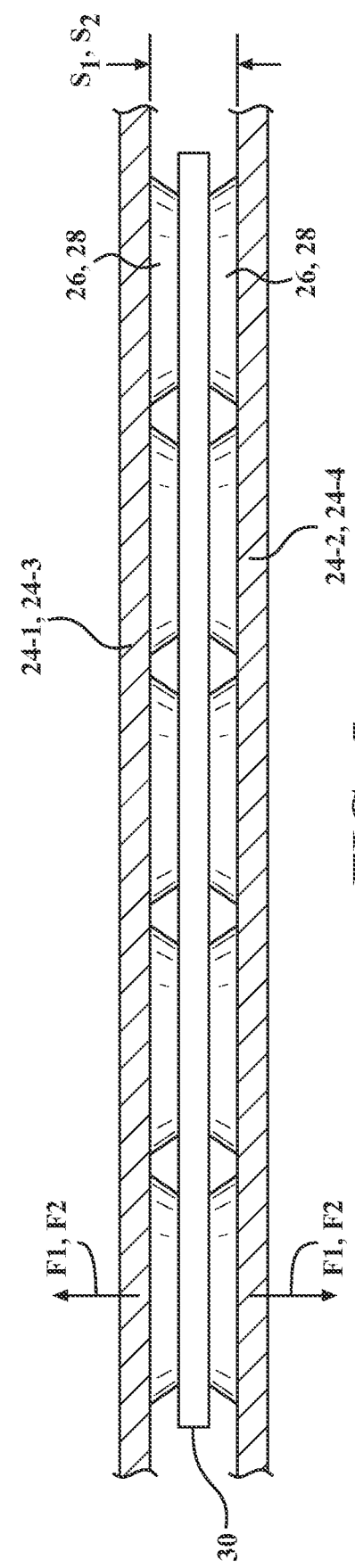
FIG. 5 is a schematic close-up cross-sectional detail view of one embodiment of the load distributing thermal runaway barrier shown in FIG. 2, specifically depicting a plurality of evenly interspaced Belleville spring elastic members arranged in series between individual separator plates, according to the disclosure.

Alternatively, as shown in FIG. 5, each of the first and second elastic members 26, 28 may include a plurality of Belleville springs arranged in series between respective individual separator plates. In the embodiment of Belleville springs arranged in series, an additional partition 30 may be arranged between the first and second elastic members 26, 28. The series arrangement of the first and second elastic members 26, 28 shown in FIG. 5 is intended to provide a more consistent, as compared to the embodiment of FIG. 4, corresponding first load $F_1$ over a larger separation $S_1$ between the first and second separator plates 24-1, 24-2 and similarly a more consistent corresponding second load $F_2$ over a larger separation $S_2$ between the third and fourth separator plates 24-3, 24-4. The internal operating pressure limits of the battery cell pack 20 may be determined empirically, such as during controlled laboratory testing over useful operating life of the battery cells 20-1, 20-2.

Figure 6:
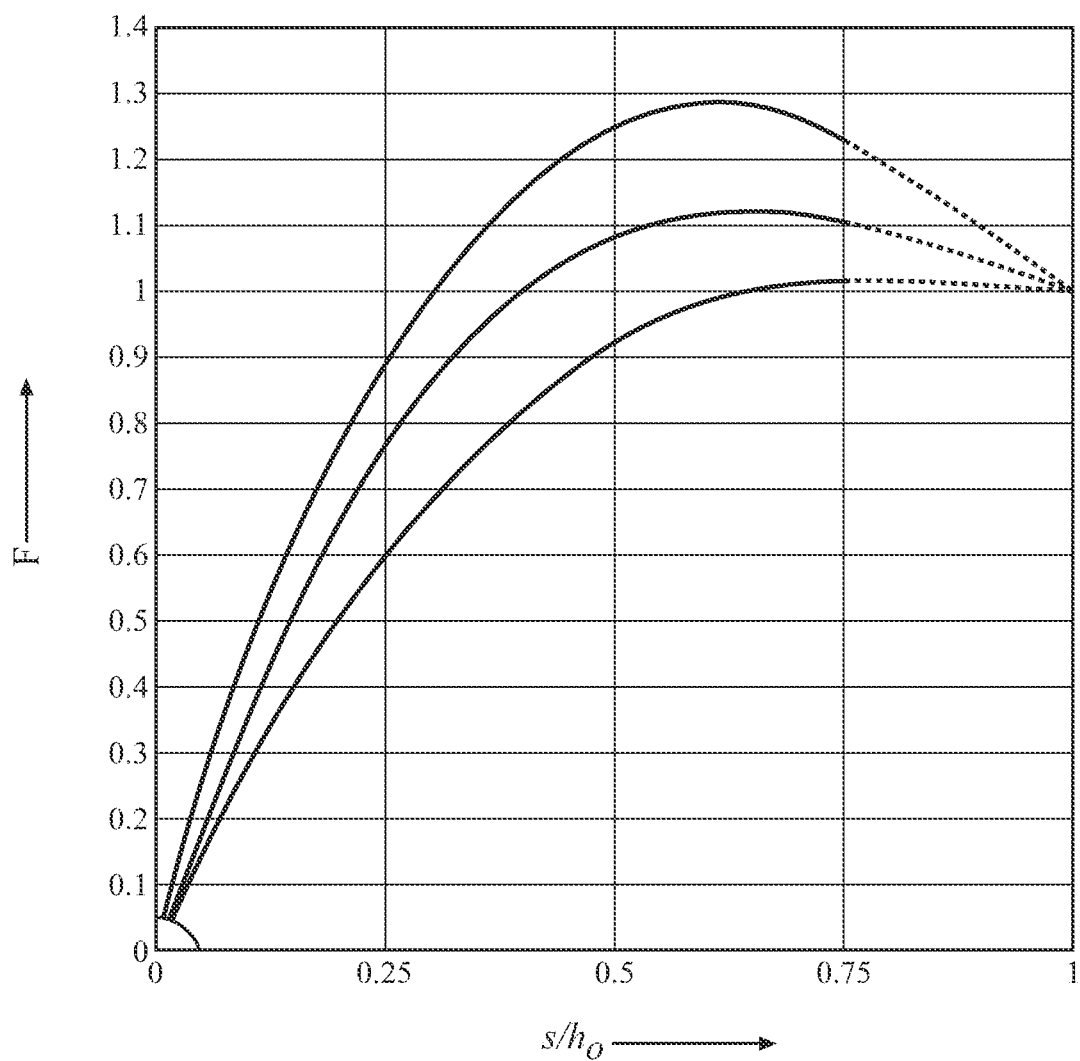
FIG. 6 is an illustration of three representative Belleville spring load-deflection curves for use in the load distributing thermal runaway barrier.
Figure 7:
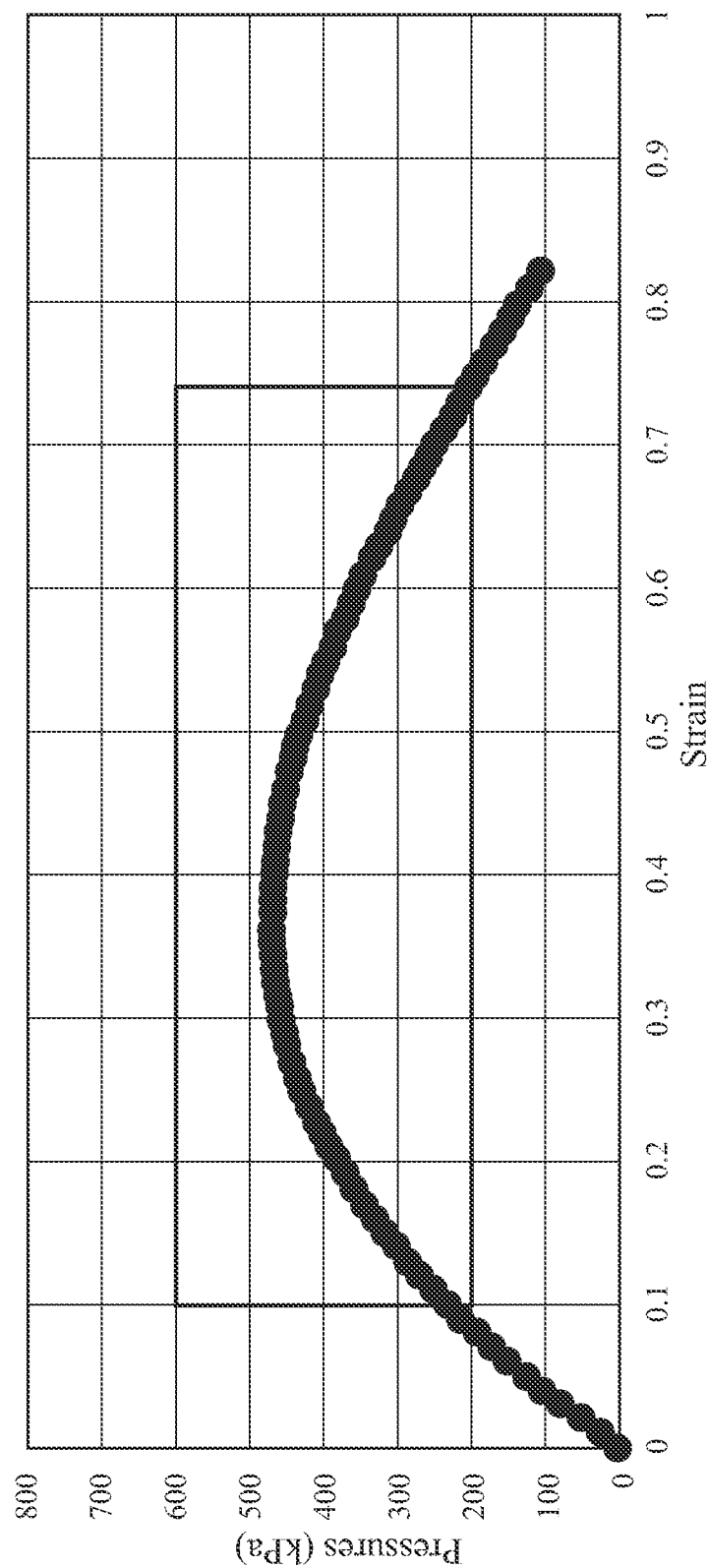
FIG. 7 is a plot of strain in a representative Belleville spring versus energy storage cell pack internal pressure within the load distributing thermal runaway barrier.

With reference to FIG. 3, the Belleville springs 26, 28 are typically specified relative to the spring's external dimeter $D_e$, internal diameter $D_i$, free height $h_0$, cone height $l_0$, and thickness t. A spring load-deflection curve $h_0/t \geq 1.5$ (shown in FIG. 6) for the appropriate Belleville spring(s) may then be calculated based on the determined internal operating pressures of the battery cell pack 20 using a standard cone disc equation. Accordingly, the free height $h_0$ and thickness t dimensions of the subject Belleville spring(s) may be tuned to provide a specific strain curve (shown in FIG. 7) under battery cell pack 20 operating pressure in the range of 200-600 kPa. Such a strain curve generates the required respective uniform first and second loads $F_1$, $F_2$ in the load distributing thermal runaway barrier 22. In the particular embodiment designed to withstand operating pressure in the range of 200-600 kPa, each of the Belleville springs for the first and second elastic members 26, 28 may have a material thickness t in a range of 0.8-1.0 mm. Additionally, each subject Belleville spring may have a free height $h_0$ in a range of 4.4-5.6 mm.

The load distributing thermal runaway barrier 22 further includes a thermally insulating pad 32 arranged between the second separator plate 24-2 and third separator plate 24-3. The thermally insulating pad 32 may be constructed from an aerogel material. The thermally insulating pad 32 may have a thickness in a range of 3.6-4.4 mm. Generally, an aerogel material is a synthetic porous ultralight material derived from a in which a liquid component for the gel has been replaced with a gas, but without significant collapse of the gel structure. Such construction of the thermally insulating pad 32 results in a solid barrier that is imbued with very low density and very low thermal conductivity. Accordingly, the thermally insulating pad 32 is configured to minimize transfer of thermal energy between neighboring battery cells, e.g., the first and second cells 20-1, 20-2, without contributing significant mass to the energy storage system 18.

With resumed reference to FIG. 2, the energy storage system 18 may also include a battery pack housing 34 configured to encase the first and second cells 20-1, 20-2 (as well as other multiple of analogous battery cells) and the thermal runaway barrier 22, which may be arranged between two individual battery cells or between two groupings of analogous cells. As shown, the battery pack housing 34 may include a first end plate 36-1 and a second end plate 36-2, each arranged at a respective distal end of the battery pack 20. As shown, the thermal runaway barrier 22 may also be arranged next to the first end plate 36-1 (or next to the second end plate 36-2), i.e., on the side of a particular battery cell 20-1, 20-2 which is distal from the respective neighboring battery cell. Furthermore, additional battery cells may be arranged alongside the first cell 20-1 and the second cell 20-2, thus the storage battery cell pack 20 may have a plurality of battery cells on each side of, i.e., sandwiching, the thermal runaway barrier 22. Alternatively, in the location adjacent the first end plate 36-1 or the second end plate 36-2, an embodiment of the thermal runaway barrier 22 which excludes the thermally insulating pad 32 may be used.

Overall, the thermal runaway barrier 22 is intended to, within limited packaging space, operate effectively across a wide range of internal battery cell pack 20 pressures and withstand high internal battery cell face pressure. Additionally, the thermal runaway barrier 22 is constructed to mitigate thermal runaway in the storage battery cell pack 20. Specifically, the first and second elastic members 26, 28 of the thermal runaway barrier 22 may distribute battery cell pack 20 internal operating pressure substantially across the faces of the first and second cells 20-1, 20-2 and surface of the thermally insulating pad 32 uniformly via the first, second, third, and fourth separator plates 24-1, 24-2, 24-3, 24-4. Such distribution of the battery cell pack 20 internal operating pressure maintains uniform contact of the thermally insulating pad 32 with adjacent components during battery cell cycling and permits the insulating pad to thermally isolate individual battery cells.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A load distributing thermal runaway barrier for an energy storage battery pack, the load distributing thermal runaway barrier comprising:
   a first separator plate;
   a second separator plate;
   at least one first elastic member arranged between the first and second separator plates and configured as at least one Belleville spring to maintain a first load in response to a pressure applied to at least one of the first and second separator plates;
   a third separator plate;
   a fourth separator plate;
   at least one second elastic member arranged between the third and fourth separator plates and configured as at least one Belleville spring to maintain a second load in response to a pressure applied to at least one of the third and fourth separator plates; and
   a thermally insulating pad arranged between the second and third separator plates.

2. The load distributing thermal runaway barrier of claim 1, wherein the thermally insulating pad is constructed from an aerogel material.

3. The load distributing thermal runaway barrier of claim 2, wherein the thermally insulating pad has a thickness in a range of 3.6-4.4 mm.

4. The load distributing thermal runaway barrier of claim 1, wherein each Belleville spring has a material thickness in a range of 0.8-1.0 mm.

5. The load distributing thermal runaway barrier of claim 1, wherein each Belleville spring has a free height in a range of 4.4-5.6 mm.

6. The load distributing thermal runaway barrier of claim 1, wherein:
   each of the at least one first elastic member includes a plurality of first Belleville springs and each of the at least one second elastic member includes a plurality of second Belleville springs;
   the plurality of first Belleville springs is arranged and evenly interspaced along the first and second separator plates; and
   the plurality of second Belleville springs is arranged and evenly interspaced along the third and fourth separator plates and configured to spread the respective first and second loads across the corresponding first and second separator plates and third and fourth separator plates.

7. The load distributing thermal runaway barrier of claim 1, wherein the at least one Belleville spring includes a plurality of Belleville springs stacked in series.

8. The load distributing thermal runaway barrier of claim 1, wherein the at least one first elastic member and the at least one second elastic member is configured to withstand internal energy storage battery pack operating pressure in a range of 200-600 kPa and maintain the respective first and second loads over the energy storage battery pack operating pressure range.

9. The load distributing thermal runaway barrier of claim 1, wherein each of the first, second, third, and fourth separator plates has a thickness in a range of 0.20-0.30 mm.

10. A motor vehicle comprising:
    a powerplant employing electrical energy to generate torque; and
    an energy storage battery pack in electric communication with the powerplant, the energy storage battery pack including:
        a first battery cell and a second battery cell, each configured to generate and store the electrical energy through thermal energy releasing electro-chemical reactions; and
        a load distributing thermal runaway barrier arranged between the first and second battery cells and having:
            a first separator plate;
            a second separator plate;
            at least one first elastic member arranged between the first and second separator plates and configured as at least one Belleville spring to maintain a first load in response to a pressure applied to at least one of the first and second separator plates;
            a third separator plate;
            a fourth separator plate;
            at least one second elastic member arranged between the third and fourth separator plates and configured as at least one Belleville spring to maintain a second load in response to a pressure applied to at least one of the third and fourth separator plates; and
            a thermally insulating pad arranged between the second and third separator plates.

11. The motor vehicle of claim 10, wherein the thermally insulating pad is constructed from an aerogel material.

12. The motor vehicle of claim 11, wherein the thermally insulating pad has a thickness in a range of 3.6-4.4 mm.

13. The motor vehicle of claim 10, wherein each Belleville spring has a material thickness in a range of 0.8-1.0 mm.

14. The motor vehicle of claim 10, wherein each Belleville spring has a free height in a range of 4.4-5.6 mm.

15. The motor vehicle of claim 10, wherein:
    each of the at least one first elastic member includes a plurality of first Belleville springs and each of the at least one second elastic member includes a plurality of second Belleville springs;
    the plurality of first Belleville springs is arranged and evenly interspaced along the first and second separator plates; and the plurality of second Belleville springs is arranged and evenly interspaced along the third and fourth separator plates and configured to spread the respective first and second loads across the corresponding first and second separator plates and third and fourth separator plates.

16. The motor vehicle of claim 10, wherein the at least one Belleville spring includes a plurality of Belleville springs stacked in series.

17. The motor vehicle of claim 10, wherein the at least one first elastic member and the at least one second elastic member is configured to withstand internal energy storage battery pack operating pressure in a range of 200-600 kPa and maintain the respective first and second loads over the internal energy storage battery pack operating pressure range.

18. The motor vehicle of claim 10, wherein each of the first, second, third, and fourth separator plates has a thickness in a range of 0.20-0.30 mm.

* * * * *